(12) United States Patent
Okamoto et al.

(10) Patent No.: US 9,240,594 B2
(45) Date of Patent: Jan. 19, 2016

(54) POSITIVE ELECTRODE ACTIVE SUBSTANCE FOR LITHIUM ION BATTERIES, POSITIVE ELECTRODE FOR LITHIUM ION BATTERIES, AND LITHIUM ION BATTERY

(75) Inventors: Kentaro Okamoto, Kitaibaraki (JP); Yoshio Kajiya, Kitaibaraki (JP)

(73) Assignee: JX Nippon Mining & Metals Corporation, Tokyo (JP)

( * ) Notice: Subject to any disclaimer, the term of this patent is extended or adjusted under 35 U.S.C. 154(b) by 0 days.

(21) Appl. No.: 13/582,096

(22) PCT Filed: Mar. 2, 2011

(86) PCT No.: PCT/JP2011/054777
§ 371 (c)(1),
(2), (4) Date: Sep. 4, 2012

(87) PCT Pub. No.: WO2011/108595
PCT Pub. Date: Sep. 9, 2011

(65) Prior Publication Data
US 2012/0326080 A1    Dec. 27, 2012

(30) Foreign Application Priority Data
Mar. 4, 2010    (JP) .................................. 2010-048114

(51) Int. Cl.
*H01M 4/525*    (2010.01)
*C01G 53/00*    (2006.01)
(Continued)

(52) U.S. Cl.
CPC .............. *H01M 4/525* (2013.01); *C01G 53/50* (2013.01); *C01G 53/66* (2013.01);
(Continued)

(58) Field of Classification Search
None
See application file for complete search history.

(56) References Cited

U.S. PATENT DOCUMENTS 2,165,128 A    7/1939    Cheesman
4,443,186 A    4/1984    Shell
(Continued)

FOREIGN PATENT DOCUMENTS

CN    1520621 A    8/2004
CN    1701451 A    11/2005
(Continued)

OTHER PUBLICATIONS

International Preliminary Report on Patentability mailed Nov. 22, 2012 in co-pending PCT application No. PCT/JP2011/054938.
(Continued)

*Primary Examiner* — Patrick Ryan
*Assistant Examiner* — Haixia Zhang
(74) *Attorney, Agent, or Firm* — Nields, Lemack & Frame, LLC

(57) ABSTRACT

The present invention provides a positive electrode active material for lithium ion battery which has a high capacity and good rate characteristics can be provided. The positive electrode active material for lithium ion battery has a layer structure represented by the compositional formula: $Li_x(Ni_y Me_{1-y})O_z$ (wherein Me represents at least one type selected from the group consisting of Mn, Co, Al, Mg, Cr, Ti, Fe, Nb, Cu and Zr, x denotes a number from 0.9 to 1.2, y denotes a number from 0.70 to 0.79, and z denotes a number of 1.9 or more), wherein the coordinates of the lattice constant a and compositional ratio (Li/M) are within the region enclosed by three lines given by the equations: $y=1.108$, $y=-37.298x+108.27$, and $y=75.833x-217.1$ on a graph in which the x-axis represents a lattice constant a and the y-axis represents a compositional ratio (Li/M) of Li to M, and the lattice constant c is 14.2 to 14.25.

9 Claims, 1 Drawing Sheet

(51) Int. Cl.
    *H01M 4/505*    (2010.01)
    *H01M 10/052*   (2010.01)

(52) U.S. Cl.
    CPC ........ *C01P 2002/77* (2013.01); *C01P 2004/61*
        (2013.01); *H01M 4/505* (2013.01); *H01M
        10/052* (2013.01); *Y02E 60/122* (2013.01)

(56) References Cited

U.S. PATENT DOCUMENTS

| | | | |
|---|---|---|---|
| 4,469,654 | A | 9/1984 | Haskett et al. |
| 5,393,622 | A * | 2/1995 | Nitta et al. ................... 429/223 |
| 5,478,674 | A | 12/1995 | Miyasaka |
| 5,759,714 | A | 6/1998 | Matsufuji et al. |
| 6,037,095 | A | 3/2000 | Miyasaka |
| 6,123,911 | A | 9/2000 | Yamaguchi et al. |
| 6,423,447 | B1 | 7/2002 | Ohsaki et al. |
| 6,582,854 | B1 | 6/2003 | Qi et al. |
| 6,984,469 | B2 | 1/2006 | Kweon et al. |
| 7,332,248 | B2 | 2/2008 | Kase et al. |
| 7,410,728 | B1 | 8/2008 | Fujimoto et al. |
| 7,645,542 | B2 | 1/2010 | Kase et al. |
| 8,354,191 | B2 | 1/2013 | Shizuka et al. |
| 8,623,551 | B2 | 1/2014 | Kawahashi et al. |
| 8,748,041 | B2 | 6/2014 | Satoh et al. |
| 8,993,160 | B2 | 3/2015 | Nagase |
| 2002/0106561 | A1 | 8/2002 | Lee et al. |
| 2003/0082448 | A1 | 5/2003 | Cho et al. |
| 2003/0104279 | A1 | 6/2003 | Miyazaki et al. |
| 2003/0211391 | A1 | 11/2003 | Cho et al. |
| 2004/0053134 | A1 | 3/2004 | Ozaki et al. |
| 2004/0110063 | A1 | 6/2004 | Uchitomi et al. |
| 2004/0197658 | A1 | 10/2004 | Kase et al. |
| 2005/0079416 | A1 | 4/2005 | Ohzuku et al. |
| 2005/0142442 | A1 | 6/2005 | Yuasa et al. |
| 2005/0158546 | A1 | 7/2005 | Shizuka |
| 2006/0083989 | A1 | 4/2006 | Suhara et al. |
| 2006/0121350 | A1 | 6/2006 | Kajiya et al. |
| 2006/0127765 | A1 | 6/2006 | Machida et al. |
| 2006/0204849 | A1 | 9/2006 | Saito et al. |
| 2006/0233696 | A1 | 10/2006 | Paulsen et al. |
| 2006/0281005 | A1 | 12/2006 | Cho et al. |
| 2007/0015058 | A1 | 1/2007 | Takezawa et al. |
| 2007/0141469 | A1 | 6/2007 | Tokunaga et al. |
| 2007/0202405 | A1 | 8/2007 | Shizuka et al. |
| 2007/0248883 | A1 | 10/2007 | Oda et al. |
| 2007/0298512 | A1 | 12/2007 | Park et al. |
| 2008/0044736 | A1 | 2/2008 | Nakura |
| 2008/0081258 | A1 | 4/2008 | Kim et al. |
| 2009/0117464 | A1 | 5/2009 | Cho et al. |
| 2009/0117469 | A1 | 5/2009 | Hiratsuka et al. |
| 2009/0148772 | A1 | 6/2009 | Kawasato et al. |
| 2009/0233176 | A1 | 9/2009 | Kita et al. |
| 2009/0286164 | A1 | 11/2009 | Wada et al. |
| 2009/0289218 | A1 | 11/2009 | Kajiya et al. |
| 2009/0299922 | A1 | 12/2009 | Malcus et al. |
| 2009/0305136 | A1 | 12/2009 | Yada et al. |
| 2010/0015514 | A1 | 1/2010 | Miyagi et al. |
| 2010/0019194 | A1 | 1/2010 | Fujiwara et al. |
| 2010/0112447 | A1 | 5/2010 | Yamamoto et al. |
| 2010/0143583 | A1 | 6/2010 | Honda et al. |
| 2010/0183922 | A1 | 7/2010 | Cho et al. |
| 2010/0209757 | A1 | 8/2010 | Ooyama et al. |
| 2010/0209771 | A1 * | 8/2010 | Shizuka et al. ................ 429/207 |
| 2010/0227222 | A1 | 9/2010 | Chang et al. |
| 2011/0031437 | A1 | 2/2011 | Nagase et al. |
| 2011/0033749 | A1 | 2/2011 | Uchida et al. |
| 2011/0076558 | A1 | 3/2011 | Miyazaki et al. |
| 2011/0250499 | A1 | 10/2011 | Hiratsuka |
| 2012/0034525 | A1 | 2/2012 | Satoh et al. |
| 2012/0231342 | A1 | 9/2012 | Satoh et al. |
| 2012/0231343 | A1 | 9/2012 | Nagase et al. |
| 2012/0244434 | A1 | 9/2012 | Nagase |
| 2012/0292562 | A1 | 11/2012 | Kajiya et al. |
| 2012/0319036 | A1 | 12/2012 | Kajiya et al. |
| 2012/0319037 | A1 | 12/2012 | Kawahashi et al. |
| 2012/0319039 | A1 | 12/2012 | Satoh |
| 2012/0319040 | A1 | 12/2012 | Okamoto et al. |
| 2012/0321956 | A1 | 12/2012 | Kawahashi et al. |
| 2012/0326098 | A1 | 12/2012 | Satoh |
| 2012/0326099 | A1 | 12/2012 | Satoh |
| 2012/0326101 | A1 | 12/2012 | Satoh |
| 2012/0326102 | A1 | 12/2012 | Satoh |
| 2013/0001463 | A1 | 1/2013 | Okamoto et al. |
| 2013/0004849 | A1 | 1/2013 | Satoh |
| 2013/0043428 | A1 | 2/2013 | Kawahashi et al. |
| 2013/0108921 | A1 | 5/2013 | Kase et al. |
| 2013/0143121 | A1 | 6/2013 | Kobayashi et al. |
| 2013/0175470 | A1 | 7/2013 | Kajiya et al. |
| 2013/0221271 | A1 | 8/2013 | Nagase et al. |
| 2013/0316239 | A1 | 11/2013 | Okamoto |
| 2014/0306152 | A1 | 10/2014 | Okamoto |
| 2014/0339465 | A1 | 11/2014 | Okamoto |
| 2014/0339466 | A1 | 11/2014 | Okamoto |
| 2015/0123029 | A1 | 5/2015 | Nagase et al. |

FOREIGN PATENT DOCUMENTS

| | | |
|---|---|---|
| CN | 1710735 A | 12/2005 |
| CN | 1947288 A | 4/2007 |
| CN | 101478044 A | 7/2009 |
| EP | 0794155 A1 | 9/1997 |
| EP | 0903796 A1 | 3/1999 |
| EP | 1244164 A1 | 9/2002 |
| EP | 1317008 A2 | 6/2003 |
| EP | 1391950 A1 | 2/2004 |
| EP | 1450423 A1 | 8/2004 |
| EP | 1742281 A1 | 1/2007 |
| EP | 2023426 A1 | 2/2009 |
| EP | 2207226 A1 | 7/2010 |
| EP | 2207227 A1 | 7/2010 |
| EP | 2219251 A1 | 8/2010 |
| EP | 2533333 A1 | 12/2012 |
| JP | 4-328277 A | 11/1992 |
| JP | 6-275274 A | 9/1994 |
| JP | 7-29603 A | 1/1995 |
| JP | 7-211311 A | 8/1995 |
| JP | 8-138669 A | 5/1996 |
| JP | 8-213015 A | 8/1996 |
| JP | 09-82325 A | 3/1997 |
| JP | 9-120813 A | 5/1997 |
| JP | 9-270257 A | 10/1997 |
| JP | 10-83815 A | 3/1998 |
| JP | 10-116618 A | 5/1998 |
| JP | 10-188986 A | 7/1998 |
| JP | 10-206322 A | 8/1998 |
| JP | 10-208744 A | 8/1998 |
| JP | 10-302779 A | 11/1998 |
| JP | 10-321224 A | 12/1998 |
| JP | 11-16573 A | 1/1999 |
| JP | 11-67205 A | 3/1999 |
| JP | 11-273676 A | 10/1999 |
| JP | 11-292542 A | 10/1999 |
| JP | 11-307094 A | 11/1999 |
| JP | 11-345615 A | 12/1999 |
| JP | 2000-30693 A | 1/2000 |
| JP | 2000-72445 A | 3/2000 |
| JP | 2000-149945 A | 5/2000 |
| JP | 2000-215884 A | 8/2000 |
| JP | 2000-348721 A | 12/2000 |
| JP | 2001-110420 A | 4/2001 |
| JP | 2001-148249 A | 5/2001 |
| JP | 2001-223008 A | 8/2001 |
| JP | 2001-266851 A | 9/2001 |
| JP | 2002-63901 A | 2/2002 |
| JP | 2002-124261 A | 4/2002 |
| JP | 3276183 B2 | 4/2002 |
| JP | 2002-164053 A | 6/2002 |
| JP | 2002-203552 A | 7/2002 |
| JP | 2002-216745 A | 8/2002 |
| JP | 2002-260655 A | 9/2002 |
| JP | 2002-289261 A | 10/2002 |
| JP | 2002-298914 A | 10/2002 |
| JP | 3334179 B2 | 10/2002 |

(56) References Cited

FOREIGN PATENT DOCUMENTS

| | | |
|---|---|---|
| JP | 2003-7299 A | 1/2003 |
| JP | 2003-17052 A | 1/2003 |
| JP | 2003-81637 A | 3/2003 |
| JP | 2003-151546 A | 5/2003 |
| JP | 2003-229129 A | 8/2003 |
| JP | 2004-6264 A | 1/2004 |
| JP | 2004-146374 A | 5/2004 |
| JP | 2004-172109 A | 6/2004 |
| JP | 2004-193115 A | 7/2004 |
| JP | 2004-214187 A | 7/2004 |
| JP | 2004-227790 A | 8/2004 |
| JP | 2004-253169 A | 9/2004 |
| JP | 2004-273451 A | 9/2004 |
| JP | 2004-355824 A | 12/2004 |
| JP | 2004-356094 A | 12/2004 |
| JP | 2005-11713 A | 1/2005 |
| JP | 2005-44743 A | 2/2005 |
| JP | 2005-53764 A | 3/2005 |
| JP | 2005-56602 A | 3/2005 |
| JP | 2005-60162 A | 3/2005 |
| JP | 2005-75691 A | 3/2005 |
| JP | 2005-183366 A | 7/2005 |
| JP | 2005-225734 A | 8/2005 |
| JP | 2005-235624 A | 9/2005 |
| JP | 2005-243636 A | 9/2005 |
| JP | 2005-251700 A | 9/2005 |
| JP | 2005-285572 A | 10/2005 |
| JP | 2005-289700 A | 10/2005 |
| JP | 2005-302507 A | 10/2005 |
| JP | 2005-302628 A | 10/2005 |
| JP | 2005-324973 A | 11/2005 |
| JP | 2005-327644 A | 11/2005 |
| JP | 2005-332707 A | 12/2005 |
| JP | 2005-347134 A | 12/2005 |
| JP | 2006-4724 A | 1/2006 |
| JP | 2006-19229 A | 1/2006 |
| JP | 2006-19310 A | 1/2006 |
| JP | 2006-54159 A | 2/2006 |
| JP | 2006-107818 A | 4/2006 |
| JP | 2006-107845 A | 4/2006 |
| JP | 2006107845 A * | 4/2006 |
| JP | 2006-127923 A | 5/2006 |
| JP | 2006-127955 A | 5/2006 |
| JP | 2006-134816 A | 5/2006 |
| JP | 2006-134852 A | 5/2006 |
| JP | 2006-156126 A | 6/2006 |
| JP | 2006-156235 A | 6/2006 |
| JP | 2006-164758 A | 6/2006 |
| JP | 2006-286614 A | 10/2006 |
| JP | 3835266 B2 | 10/2006 |
| JP | 2006-302542 A | 11/2006 |
| JP | 2006-351379 A | 12/2006 |
| JP | 2007-48744 A | 2/2007 |
| JP | 2007-95443 | 4/2007 |
| JP | 2007-194202 | 8/2007 |
| JP | 2007-214138 | 8/2007 |
| JP | 2007-226969 | 9/2007 |
| JP | 2007-227368 | 9/2007 |
| JP | 2007-257890 | 10/2007 |
| JP | 2007-280723 | 10/2007 |
| JP | 2008-13405 | 1/2008 |
| JP | 4070585 B2 | 4/2008 |
| JP | 2008-103132 | 5/2008 |
| JP | 2008-181708 | 8/2008 |
| JP | 2008-192547 A | 8/2008 |
| JP | 2008-266136 | 11/2008 |
| JP | 2008-277106 A | 11/2008 |
| JP | 4175026 B2 | 11/2008 |
| JP | 2008-544468 A | 12/2008 |
| JP | 2009-117365 A | 5/2009 |
| JP | 2009-135070 A | 6/2009 |
| JP | 2009-151959 A | 7/2009 |
| JP | 4287901 B2 | 7/2009 |
| JP | 2009-289726 A | 12/2009 |
| JP | 2010-15959 A | 1/2010 |
| JP | 2010-47466 A | 3/2010 |
| JP | 2010-192200 A | 9/2010 |
| JP | 2011-44364 A | 3/2011 |
| JP | 2012-169224 A | 9/2012 |
| JP | 2012-243572 A | 12/2012 |
| JP | 2013-152911 A | 8/2013 |
| KR | 10-2010-0060362 A | 6/2010 |
| TW | 363940 | 7/1999 |
| WO | 02/086993 A1 | 10/2002 |
| WO | 03/003489 A1 | 1/2003 |
| WO | 2004/064180 A1 | 7/2004 |
| WO | 2007/072759 A1 | 6/2007 |
| WO | 2008/084679 A1 | 7/2008 |
| WO | 2009/011157 A1 | 1/2009 |
| WO | 2009/060603 A1 | 5/2009 |
| WO | 2009/063838 A1 | 5/2009 |
| WO | 2009/128289 A1 | 10/2009 |
| WO | 2010/049977 A1 | 5/2010 |
| WO | 2010/113512 A1 | 10/2010 |
| WO | 2010/113583 A1 | 10/2010 |
| WO | 2011/007751 A1 | 1/2011 |
| WO | 2011/065391 A1 | 6/2011 |
| WO | 2011/108720 A1 | 9/2011 |
| WO | 2011/122448 A1 | 10/2011 |
| WO | 2012/098724 A1 | 7/2012 |
| WO | 2012/132071 A1 | 10/2012 |
| WO | 2012/132072 A1 | 10/2012 |
| WO | 2012/157143 A1 | 11/2012 |

OTHER PUBLICATIONS

International Preliminary Report on Patentability mailed Nov. 22, 2012 in co-pending PCT application No. PCT/JP2011/055111.
International Search Report mailed Nov. 1, 2011 in co-pending PCT application No. PCT/JP2011/066722.
International Search Report mailed Apr. 10, 2012 in co-pending PCT application No. PCT/JP2011/079535.
Office Action-Restriction-mailed Mar. 12, 2013 in co-pending U.S. Appl. No. 13/508,887.
Office Action mailed Mar. 13, 2013 in co-pending U.S. Appl. No. 13/582,091.
International Search Report mailed Jun. 8, 2010 in co-pending PCT application No. PCT/JP010/053443.
International Preliminary Report on Patentability mailed Nov. 17, 2011 in co-pending PCT application No. PCT/JP2010/053443.
International Search Report mailed May 24, 2011 in co-pending PCT application No. PCT/JP2011/053271.
International Search Report/Written Opinion mailed Mar. 8, 2011 in co-pending PCT application No. PCT/JP2010/071723.
International Preliminary Report on Patentability mailed Jul. 12, 2012 in co-pending PCT application No. PCT/JP2010/071723.
International Search Report mailed Jan. 24, 2012 in co-pending PCT application No. PCT/JP2011/072860.
International Search Report/Written Opinion mailed Jan. 25, 2011 in co-pending PCT application No. PCT/JP2010/071724.
International Preliminary Report on Patentability issued Jul. 10, 2012 in co-pending PCT application No. PCT/JP2010/071724.
International Search Report mailed Apr. 26, 2011 in co-pending PCT application No. PCT/JP2011/052394.
International Preliminary Report on Patentability mailed Oct. 11, 2012 in co-pending PCT application No. PCT/JP2011/052394.
International Search Report mailed May 10, 2011 in co-pending PCT application No. PCT/JP2011/052399.
International Preliminary Report on Patentability mailed Oct. 11, 2012 in co-pending PCT application No. PCT/JP2011/052399.
International Search Report mailed Nov. 15, 2011 in co-pending PCT application No. PCT/JP2011/069042.
International Search Report/Written Opinion mailed Jun. 7, 2011 in co-pending PCT application No. PCT/JP2011/054935.
International Preliminary Report on Patentability mailed Oct. 11, 2012 in co-pending PCT application No. PCT/JP2011/054935.
International Search Report mailed Jun. 7, 2011 in co-pending PCT application No. PCT/JP2011/054938.
International Search Report/Written Opinion mailed May 17, 2011 in co-pending PCT application No. PCT/JP2011/054942.

(56) References Cited

OTHER PUBLICATIONS

International Preliminary Report on Patentability issued Oct. 2, 2012 in co-pending PCT application No. PCT/JP2011/054942.
International Search Report/Written Opinion mailed Jun. 7, 2011 in co-pending PCT application No. PCT/JP2011/054934.
International Preliminary Report on Patentability mailed Oct. 11, 2012 in co-pending PCT application No. PCT/JP2011/054934.
International Search Report/Written Opinion mailed May 17, 2011 in co-pending PCT application No. PCT/JP2011/054941.
International Preliminary Report on Patentability issued Oct. 2, 2012 in co-pending PCT application No. PCT/JP2011/054941.
International Search Report mailed May 10, 2011 in co-pending PCT application No. PCT/JP2011/055111.
International Search Report/Written Opinion mailed May 17, 2011 in co-pending PCT application No. PCT/JP2011/053710.
International Preliminary Report on Patentability issued Oct. 2, 2012 in co-pending PCT application No. PCT/JP2011/053710.
International Search Report/Written Opinion mailed May 24, 2011 in corresponding PCT application No. PCT/JP2011/054777.
International Preliminary Report on Patentability issued Oct. 2, 2012 in corresponding PCT application No. PCT/JP2011/054777.
International Search Report mailed May 24, 2011 in co-pending PCT application No. PCT/JP2011/054781.
Written Opinion mailed Jun. 24, 2011 in co-pending PCT application No. PCT/JP2011/054781.
International Preliminary Report on Patentability mailed Oct. 11, 2012 n co-pending PCT application No. PCT/JP2011/054781.
International Search Report/Written Opinion mailed May 24, 2011 in co-pending PCT application No. PCT/JP2011/054779.
International Preliminary Report on Patentability issued Oct. 2, 2012 in co-pending PCT application No. PCT/JP2011/054779.
Electrochimica Acta, vol. 51, 2006, pp. 5581-5586, "Preparation and electrochemical properties of $LiCoO_2$-$LiNi0.5Mn0.5O_2$-$Li_2MnO_3$ solid solutions with high Mn contents", Sun, et al.
International Preliminary Report on Patentability mailed Oct. 10, 2013 in co-pending PCT application No. PCT/JP0212/057974.
Office Action mailed Dec. 4, 2013 in co-pending U.S. Appl. No. 13/508,880.
Office Action mailed Dec. 18, 2013 in co-pending U.S. Appl. No. 13/514,080.
Final Rejection mailed Jan. 9, 2014 in co-pending U.S. Appl. No. 13/576,548.
Notice of Allowance mailed Nov. 6, 2013 in U.S. Appl. No. 13/582,091 (now U.S. Pat. No. 8,623,551.
Office Action mailed Jun. 10, 2013 in co-pending U.S. Appl. No. 13/508,887.
Office Action mailed Jul. 16, 2013 in co-pending U.S. Appl. No. 13/514,080.
Office Action mailed Jul. 29, 2013 in co-pending U.S. Appl. No. 13/576,548.
Office Action mailed Aug. 1, 2013 in co-pending U.S. Appl. No. 13/581,546.
Office Action mailed Jul. 17, 2013 in co-pending U.S. Appl. No. 13/581,814.
Office Action mailed Jul. 12, 2013 in co-pending U.S. Appl. No. 13/582,101.
Office Action mailed Jul. 15, 2013 in co-pending U.S. Appl. No. 13/582,113.
Office Action mailed Aug. 13, 2013 in co-pending U.S. Appl. No. 13/582,067.
International Preliminary Report on Patentability mailed Sep. 26, 2013 in co-pending PCT application No. PCT/JP2011/053271.
International Preliminary Report on Patentability mailed Oct. 10, 2013 in co-pending PCT application No. PCT/JP2011/072860.
International Preliminary Report on Patentability mailed Aug. 1, 2013 in co-pending PCT application No. PCT/JP2011/069042.
Japanese Communication mailed Oct. 1, 2013 in co-pending Japanese patent application No. JP 2012-503253.
Japanese Communication mailed Oct. 1, 2013 in co-pending Japanese patent application No. JP 2012-503255.
Japanese Communication mailed Oct. 1, 2013 in co-pending Japanese patent application No. JP 2012-503252.
International Preliminary Report on Patentability mailed Jun. 13, 2013 in co-pending PCT application No. PCT/JP2011/066722.
International Search Report mailed Jun. 5, 2012 in co-pending PCT application No. PCT/JP2012/057974.
International Journal of Inorganic Materials 3 (2001), pp. 323-329, "Structural and electrochemical properties of Li—Ni—Co oxides synthesized by wet chemistry via a succinic-acid-assisted technique", Castro-Garcia, et al.
Office Action mailed Oct. 3, 2013 in co-pending U.S. Appl. No. 13/258,120.
Final Rejection mailed Sep. 19, 2013 in co-pending U.S. Appl. No. 13/508,887.
Office Action mailed Sep. 17, 2013 in co-pending U.S. Appl. No. 13/856,514.
European communication issued May 9, 2014 in co-pending European patent application No. EP 11739870.1.
Chinese communication dated May 12, 2014 in co-pending Chinese patent application No. CN 201180008573.3.
European communication issued May 9, 2014 in corresponding European patent application No. EP 11750704.6.
European communication issued May 22, 2014 in co-pending European patent application No. EP 11750705.3.
European communication issued May 6, 2014 in co-pending European patent application No. EP 11845955.1.
International Search Report mailed Dec. 25, 2012 in co-pending PCT application No. PCT/JP2012/074263.
International Search Report mailed Dec. 25, 2012 in co-pending PCT application No. PCT/JP2012/074266.
International Search Report mailed Aug. 27, 2013 in co-pending PCT application No. PCT/JP2013/064941.
Int. J. Electrochem. Sci., vol. 4, 2009, pp. 1770-1778, "Improved High Rate Cycling of Li-rich $Li(1.10)Ni(1/3)Co(1/3)Mn(1/3)O(2)$ Cathode for Lithium Batteries", Santhanam, et al.
Notice of Allowance mailed Mar. 20, 2014 in co-pending U.S. Appl. No. 13/258,120 (now U.S. Pat. No. 8,748,041).
Final Rejection mailed Jun. 18, 2014 in co-pending U.S. Appl. No. 13/508,880.
Final Rejection mailed Feb. 27, 2014 in co-pending U.S. Appl. No. 13/856,514.
Final Rejection mailed Jun. 3, 2014 in co-pending U.S. Appl. No. 13/514,080.
Office Action mailed Jul. 1, 2014 in co-pending U.S. Appl. No. 13/576,548.
Office Action mailed Jul. 8, 2014 in co-pending U.S. Appl. No. 13/576,753.
Final Rejection mailed Jan. 27, 2014 in co-pending U.S. Appl. No. 13/581,546.
Final Rejection mailed Jan. 24, 2014 in co-pending U.S. Appl. No. 13/582,067.
Final Rejection mailed Jan. 27, 2014 in co-pending U.S. Appl. No. 13/581,814.
Final Rejection mailed Feb. 7, 2014 in co-pending U.S. Appl. No. 13/582,101.
Final Rejection mailed Feb. 18, 2014 in co-pending U.S. Appl. No. 13/582,113.
European communication dated Oct. 27, 2014 in co-pending European patent application No. EP 10839166.5.
European communication dated Nov. 5, 2014 in co-pending European patent application No. EP 11856183.6.
European communication dated Oct. 20, 2014 in co-pending European patent application No. EP 12763420.2.
Office Action mailed Nov. 5, 2014 in co-pending U.S. Appl. No. 13/582,087.
Japanese communication mailed Apr. 7, 2015 in co-pending Japanese patent application No. 2012-503258.
International Preliminary Report on Patentability mailed Mar. 19, 2015 in co-pending PCT application No. PCT/JP2013/064941.
International Preliminary Report on Patentability mailed Apr. 2, 2015 in co-pending PCT application No. PCT/JP2013/076598.
Wikipedia, Karl Fischer Titration article, Waybackmachine.com snapshot dtd., Sep. 12, 2010, 2 pages.

(56) References Cited

OTHER PUBLICATIONS

Office Action mailed Mar. 25, 2015 in co-pending U.S. Appl. No. 13/581,423.
Office Action mailed Mar. 18, 2015 in co-pending U.S. Appl. No. 13/816,822.
Office Action mailed Apr. 3, 2015 in co-pending U.S. Appl. No. 13/822,447.
Office Action mailed Apr. 23, 2015 in co-pending U.S. Appl. No. 14/364,795.
Office Action mailed Apr. 3, 2015 in co-pending U.S. Appl. No. 14/364,809.
Office Action mailed Apr. 3, 2015 in co-pending U.S. Appl. No. 14/364,830.
Office Action mailed May 14, 2015 in co-pending U.S. Appl. No. 13/984,947.
International Preliminary Report on Patentability mailed Jul. 31, 2014 in co-pending PCT application No. PCT/JP2012/074263.
International Preliminary Report on Patentability mailed Jul. 31, 2014 in co-pending PCT application No. PCT/JP2012/074266.
Journal of The Electrochemical Society, 151 (11), 2004, pp. A1899-A1904, "Synthesis, Thermal, and Electrochemical Properties of AlPO4-Coated LiNi0.8Co0.1Mn0.1O2 Cathode Materials for Li-Ion Cell", Cho, et al.
Journal of The Electrochemical Society, 155 (3), 2008, pp. A239-A245, "Storage Characteristics of LiNi0.8Co0.1+xMn0.1-xO2 (x=0, 0.03, and 0.06) Cathode Materials for Lithium Ion Batteries", EOM, et al.
Machine English translation for CN 1710735 (2005), 9 pages, European Patent Office, http://translationportal.epo.org . . . , retrieved from the Internet Oct. 6, 2014.
Final Rejection mailed Sep. 18, 2014 in co-pending U.S. Appl. No. 13/508,887.
Office Action mailed Sep. 18, 2014 in co-pending U.S. Appl. No. 13/856,514.
Office Action mailed Oct. 9, 2014 in co-pending U.S. Appl. No. 13/695,663.
Office Action mailed Sep. 9, 2014 in co-pending U.S. Appl. No. 13/514,080.
Office Action mailed Oct. 2, 2014 in co-pending U.S. Appl. No. 13/582,089.
Office Action mailed Oct. 3, 2014 in co-pending U.S. Appl. No. 13/581,730.
European Communication dated Jan. 5, 2015 in co-pending European patent application No. 11842456.3.
European Communication dated Dec. 9, 2014 in co-pending European patent application No. 11750768.1.
European Communication dated Dec. 9, 2014 in co-pending European patent application No. 11750762.4.
European Communication dated Feb. 17, 2015 in co-pending European patent application No. 11865511.7.
Chinese Communication dated Jan. 12, 2015 in co-pending Chinese patent application No. 201280004477.6.
International Search Report mailed Jan. 7, 2014 in co-pending PCT application No. PCT/JP2013/076598.
Journal of the The Electrochemical Society, vol. 151, No. 10, Sep. 2004, pp. A1707-A1711, "Comparison of Overcharge Behavior of AlPO4-Coated LiCoO2 and LiNi0.8Co0.1Mn0.1O2 Cathode Materials in Li-Ion Cells", Cho, et al.
Journal of Power Sources, vol. 146, 2005, pp. 39-44, "Performance of LiNiCoO2 materials for advanced lithium-ion batteries", Itou, et al.
Ceramics International, vol. 35, No. 4, May, 2009, pp. 1633-1639, "Fine-sized LiNi0.8Co0.15Mn0.05O2 cathode particles prepared by spray pyrolysis from the polymeric precursor solutions", Ju, et al.
Journal of Alloys and Compounds, vol. 469, No. 1-2, Feb. 2009, pp. 304-309, "Effects of the ratio of manganese and nickel components on the characteristics of Lix(MnyNi1-y)Oz cathode powders prepared by spray pyrolysis", Ju, et al.
Journal of Power Sources, vol. 153, No. 2, Feb. 2006, pp. 345-349, "Improvement of 12V overcharge behavior of LiCoO2 cathode material by LiNi0.8Co0.1Mn0.1O2 addition in a Li-ion cell", Kim, et al.
Journal of Applied Electrochemistry, vol. 38, No. 5, Jan. 2008, pp. 613-617, "Comparative study of the preparation and electrochemical performance of LiNi1/2Mn1/2O2 electrode material for rechargeable lithium batteries", Lian, et al.
Notice of Allowance mailed Jan. 15, 2015 in co-pending U.S. Appl. No. 13/514,080.
Final Rejection mailed Jan. 23, 2015 in co-pending U.S. Appl. No. 13/576,548.
Final Rejection mailed Jan. 28, 2015 in co-pending U.S. Appl. No. 13/576,753.
Office Action—Restriction—mailed Jan. 26, 2015 in co-pending U.S. Appl. No. 13/581,423.
Final Rejection mailed Feb. 12, 2015 in co-pending U.S. Appl. No. 13/582,089.
Final Rejection mailed Feb. 13, 2015 in co-pending U.S. Appl. No. 13/582,087.
Office Action mailed Feb. 25, 2015 in co-pending U.S. Appl. No. 13/508,880.
Final Rejection mailed Feb. 24, 2015 in co-pending U.S. Appl. No. 13/695,663.
Final Rejection mailed Feb. 27, 2015 in co-pending U.S. Appl. No. 13/581,730
Office Action mailed Feb. 26, 2015 in co-pending U.S. Appl. No. 13/582,101.
Office Action mailed Feb. 26, 2015 in co-pending U.S. Appl. No. 13/582,113.
Notice of Allowance mailed Aug. 26, 2015 in co-pending U.S. Appl. No. 13/695,663.
Notice of Allowance mailed Sep. 10, 2015 in co-pending U.S. Appl. No. 13/576,753.
Notice of Allowance mailed Oct. 22, 2015 in co-pending U.S. Appl. No. 13/582,101.
Notice of Allowance mailed Oct. 22, 2015 in co-pending U.S. Appl. No. 13/582,113.
Notice of Allowance mailed Oct. 21, 2015 in co-pending U.S. Appl. No. 13/984,947.
Notice of Allowance mailed Sep. 8, 2015 in co-pending U.S. Appl. No. 14/364,795.
Notice of Allowance mailed Sep. 10, 2015 in co-pending U.S. Appl. No. 14/364,809.

* cited by examiner

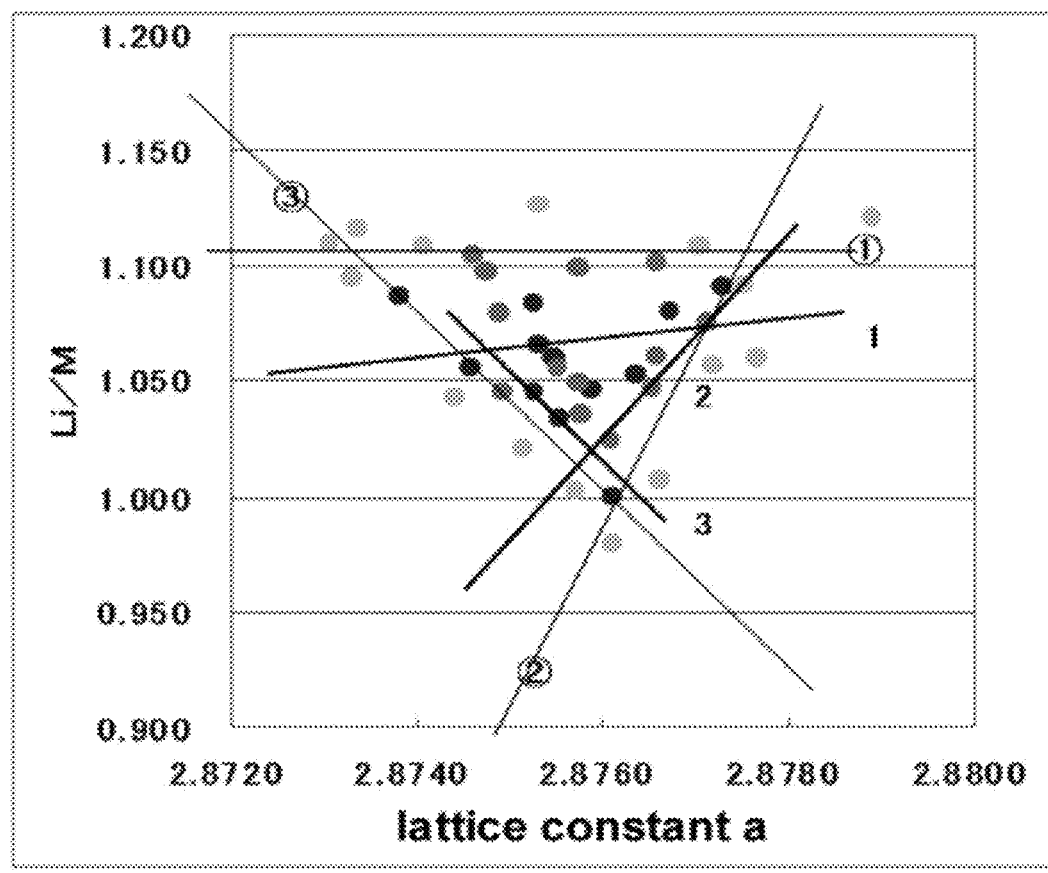

POSITIVE ELECTRODE ACTIVE SUBSTANCE FOR LITHIUM ION BATTERIES, POSITIVE ELECTRODE FOR LITHIUM ION BATTERIES, AND LITHIUM ION BATTERY

BACKGROUND OF THE INVENTION

1. Field of the Invention

The present invention relates to a positive electrode active material for lithium ion battery, a positive electrode for lithium ion battery, and a lithium ion battery.

2. Description of Related Art

A lithium-containing transition metal oxide is generally used as the positive electrode active material of a lithium ion battery. Specific examples of the lithium-containing transition metal oxide include lithium cobaltate ($LiCoO_2$), lithium nickelate ($LiNiO_2$), and lithium manganate ($LiMn_2O_4$). The complexation of these metal oxides is undergone to improve the characteristics (high capacity, cycle characteristics, preserving characteristics, reduction in internal resistance, and rate characteristics) and safety. The characteristics different from those required for lithium ion batteries in mobile telephones and personal computers are required for lithium ion batteries used in large-sized battery applications such as car applications and road leveling applications. Particularly, high capacity and rate characteristics are regarded as important.

Various methods have been used to attain high capacity and to improve the rate characteristics. For example, Patent document 1 discloses a lithium battery positive electrode made of a complex oxide represented by the general formula $Li_wNi_xCo_yAl_zO_2$ (wherein w=0.90 to 1.10, x=0.80 to 0.95, y=0.04 to 0.19, z=0.01 to 0.16, and x+y+z=1.0) and also describes that a lithium battery positive electrode material, which has a large discharged capacity, is reduced in the deteriorations of battery characteristics caused by repetitive charge/discharge, is superior in cycle characteristics, is limited in the generation of gas caused by the decomposition of a positive electrode material after charged, and improved in preservability/safety, can be provided.

Also, Patent document 2 discloses a complex oxide represented by the general formula $A_wD_vNi_xAl_yN_zO_2$ (wherein A represents at least one type selected from alkali metals, D represents at least one type selected from Mg and B, N represents at least one type selected from Si, Ca, Cu, P, In, Sn, Mo, Nb, Y, Bi, and Ga, w, v, x, y, and z respectively denote a number given by the following formulae: $0.05 \leq w \leq 1.2$, $0.001 \leq v \leq 0.2$, $0.5 \leq x \leq 0.9$, $0.1 < y \leq 0.5$, and $0.001 \leq z \leq 0.2$) as a positive electrode active material in a battery which comprises a negative electrode, a positive electrode, and a non-aqueous electrolyte including a lithium salt and can be plurally charged/discharged reversively. Patent document 2 also describes that this oxide enables a secondary battery positive electrode material to excel in all battery characteristics such as high capacitization, long life, rate characteristics, high-temperature characteristics, and safety.

(Patent document 1) Japanese Patent Application Publication No. 10-321224
(Patent document 2) Japanese Patent Application Publication No. 10-208744

SUMMARY OF INVENTION

However, high capacitization and rate characteristics are important characteristics required for a battery and there is a room for improvement of a high-quality positive electrode active material for lithium ion battery.

In view of this situation, an object of the present invention is to provide a positive electrode material for lithium ion battery having a high capacity and good rate characteristics.

The inventors have made earnest studies, and as a result, attracted their attentions to the relation between the lattice constant a of the positive electrode active material, compositional ratio of Li to metals (M) other than Li, and battery characteristics, to find that a battery produced using the positive electrode active material has good characteristics if the coordinates of a lattice constant a and compositional ratio (Li/M) are within a predetermined region on a graph in which the x-axis represents the lattice constant a and the y-axis represents the compositional ratio (Li/M) of Li to M.

According to a first aspect of the present invention completed based on the above teachings, there is provided a positive electrode active material for lithium ion battery which has a layer structure represented by the compositional formula: $Li_x(Ni_yMe_{1-y})O_z$ (wherein Me represents at least one type selected from the group consisting of Mn, Co, Al, Mg, Cr, Ti, Fe, Nb, Cu and Zr, x denotes a number from 0.9 to 1.2, y denotes a number from 0.70 to 0.79, and z denotes a number of 1.9 or more), wherein the coordinates of the lattice constant a and compositional ratio (Li/M) are within the region enclosed by three lines given by the equations: $y=1.108$, $y=-37.298x+108.27$, and $y=75.833x-217.1$ on a graph in which the x-axis represents a lattice constant a and the y-axis represents a compositional ratio (Li/M) of Li to M, and the lattice constant c is 14.2 to 14.25.

In an embodiment of the positive electrode active material for lithium ion battery according to the present invention, the coordinates of the lattice constant a and compositional ratio (Li/M) are within the region enclosed by three lines given by the equations: $y=5x-13.311$, $y=49.737x-142.02$, and $y=-60x+173.56$.

In another embodiment of the positive electrode active material for lithium ion battery according to the present invention, Me is one metal selected from the group consisting of Mn, Co, and Al.

According to another aspect of the present invention, there is provided a positive electrode for lithium ion battery comprising the positive electrode active material according to the present invention.

According to a further aspect of the present invention, there is provided a lithium ion battery comprising the positive electrode for lithium ion battery according to the present invention.

Advantageous Effect of the Invention

According to the present invention, a positive electrode active material for lithium ion battery which has a high capacity and good rate characteristics can be provided.

BRIEF DESCRIPTION OF DRAWING

FIG. 1 is a graph of "lattice constant a"—"compositional ratio of Li/M" according to an example.

DETAILED DESCRIPTION OF EMBODIMENTS (Structure of Positive Electrode Active Material for Lithium Ion Battery)

As the material of the positive electrode active material for lithium ion battery according to the present invention, compounds useful as the positive electrode active material for the positive electrode of usual lithium ion batteries may be widely used. It is particularly preferable to use a lithium-containing transition metal oxide such as lithium cobaltate ($LiCoO_2$), lithium nickelate ($LiNiO_2$), and lithium manganate ($LiMn_2O_4$). The positive electrode active material for lithium ion battery which is produced using materials like the above has a layer structure represented by the compositional formula: $Li_x(Ni_yMe_{1-y})O_z$ (wherein Me represents at least one type selected from Mn, Co, Al, Mg, Cr, Ti, Fe, Nb, Cu and Zr, x denotes a number from 0.9 to 1.2, y denotes a number from 0.70 to 0.79, and z denotes a number of 1.9 or more).

The ratio of lithium to the total metals in the positive electrode active material for lithium ion battery is 0.9 to 1.2. It is because a stable crystal structure is scarcely kept when the ratio is less than 0.9 whereas high capacity of the battery cannot be secured when the ratio exceeds 1.2.

The positive electrode active material for lithium ion battery according to the present invention has the characteristics that the coordinates of the lattice constant a and compositional ratio (Li/M) are within the region enclosed by three lines given by the equations: $y=1.108$, $y=-37.298x+108.27$, and $y=75.833x-217.1$ on a graph in which the x-axis represents the lattice constant a and the y-axis represents the compositional ratio (Li/M) of Li to M, and the lattice constant c is 14.2 to 14.25. When the lattice constant c is 14.2 to 14.25 and the coordinates of the lattice constant a and compositional ratio (Li/M) are within the above described region, the battery capacity using the positive electrode active material can be increased and the rate characteristics can be excellent.

Also, the coordinates of the lattice constant a and compositional ratio (Li/M) are preferably within a narrower region enclosed by three lines given by the equations: $y=5x-13.311$, $y=49.737x-142.02$, and $y=-60x+173.56$, and the lattice constant c is preferably 14.22 to 14.25.

The positive electrode active material for lithium ion battery is constituted of primary particles, secondary particles formed from aggregated primary particles, or a mixture of primary particles and secondary particles. The average particle diameter of these primary and secondary particles of the positive electrode active material for lithium ion battery is preferably 2 to 8 µm.

When the average particle diameter is less than 2 µm, this makes it difficult to apply the positive electrode active material to the current collector. When the average particle diameter exceeds 8 µm, voids are easily produced when the active material particles are filled, leading to less fillability. The average particle diameter is more preferably 3 to 6 µm.

(Structure of Positive Electrode for Lithium Ion Battery and Lithium Ion Battery Using Positive Electrode)

The positive electrode for lithium ion battery according to an embodiment of the present invention has a structure in which a positive electrode mix prepared by blending, for example, a positive electrode active material for lithium ion battery which has the aforementioned structure, a conductive adjuvant, and a binder is applied to one or both surfaces of a current collector made of an aluminum foil or the like. Also, a lithium ion battery according to the embodiment of the present invention is provided with the positive electrode for lithium ion battery having such a structure.

(Method for Producing Positive Electrode Active Material for Lithium Ion Battery)

Next, a method for producing a positive electrode active material for lithium ion battery according to the embodiment of the present invention will be explained in detail.

First, a metal salt solution containing an oxidant is prepared. The metal salt is a sulfate, chloride, nitrate, acetate, or the like and, particularly, a nitrate is preferable. This is because the nitrate can be calcined as it is, so that a cleaning process can be omitted, even if the nitrate is mixed as impurities in the calcination raw material, and the nitrate functions as an oxidant to promote oxidation of metals in the calcination raw material. The metal contained in the metal salt is Ni and at least one or more types selected from Mn, Co, Al, Mg, Cr, Ti, Fe, Nb, Cu, and Zr. As the nitrate of a metal, for example, nickel nitrate, cobalt nitrate, or manganese nitrate may be used. At this time, the metal salt is prepared such that each metal is contained in a desired molar ratio. The molar ratio of each metal in the positive electrode active material is thereby determined.

Next, lithium carbonate is suspended in pure water, and then, a metal salt solution of the above metal is poured into the mixture to produce a lithium salt solution slurry. At this time, lithium-containing carbonate microparticles precipitate in the slurry. In this case, a sulfate or chloride is washed with a saturated lithium carbonate solution and then separated by filtration when the lithium compound does not react with the metal salt in the heat-treatment. When, like the case of using a nitrate or acetate, the lithium compound reacts as the lithium raw material during heat treatment, these metal salts are not washed and separated as it is by filtration, followed by drying, thereby enabling the salt to be used as a calcination precursor.

Next, the separated lithium-containing carbonate is dried to obtain a lithium salt composite (precursor of a positive electrode active material for lithium ion battery) powder.

Next, a sagger having a predetermined capacity is prepared and the powder of the precursor of a positive electrode active material for lithium ion battery is filled in the sagger. Next, the sagger filled with the powder of the precursor of the positive electrode active material for lithium ion battery is transferred to a kiln to calcine. The calcination is performed by keeping the sagger with heating for a predetermined time in an oxygen atmosphere. Also, it is desirable that the calcination is performed under a pressure of 101 to 202 KPa because the quantity of oxygen in the composition is increased. The calcination temperature is 700 to 1100° C., and the calcination is carried out preferably at 700 to 950° C. when y in the above formula satisfies the equation: $0<y\le0.5$ and at 850 to 1100° C. when y in the above formula satisfies the equation: $0.5<y\le0.79$. The crystallinity of the positive electrode active material is largely caused by the relation between the composition and calcination temperature. At this time, there is the case where even a small difference in composition affects the crystallinity of the positive electrode active material though depending on the range of calcination temperature. When the positive electrode active material precursor is made to have a proper compositional ratio and calcined at a proper calcination temperature corresponding to the compositional ratio, the crystallinity of the positive electrode active material is improved to make a high-performance positive electrode active material. Also, the crystallinity of the positive electrode active material is affected not only by the above factor but also by the grain size of the precursor and the amount of lithium carbonate used as the raw material. When the amount of lithium carbonate is large and a lot of lithium is contained in the positive electrode material precursor, the calcination proceeds smoothly. In this case, the lattice constant c is decreased with increase in calcination temperature whereas the lattice constant c is increased with decrease in calcination temperature because the calcination is insufficient.

After that, the powder is taken out of the sagger and ground to obtain a positive electrode active material powder.

In this case, when a nitrate is used as the metal salt to be poured in the production of the lithium salt solution slurry, a positive electrode active material containing oxygen exceeding that in the compositional formula is finally produced. Also, when the calcination of the positive electrode precursor is performed not under atmospheric pressure but under a predetermined pressure, a positive electrode active material containing oxygen exceeding that in the compositional formula is finally produced. When the positive electrode active material contains oxygen exceeding that in the compositional formula as mentioned above, a battery using the positive electrode active material is improved in various characteristics.

EXAMPLES

Although examples are provided for facilitating understanding of the present invention and its advantage, the present invention is not limited to the following examples.

Examples 1 to 26

First, lithium carbonate to be charged in an amount as described in Table 1 was suspended in 3.2 liter of pure water, and then, 4.8 liter of a metal salt solution was added to the mixture. Here, the metal salt solution was prepared in such a manner that the compositional ratio of a hydrate of a nitrate of each metal was that described in Table 1 and the number of moles of all metals was 14.

In this case, the amount of lithium carbonate to be suspended is a value at which x in the formula $Li_x(Ni_yMe_{1-y})O_z$ of a product (positive electrode for lithium ion secondary battery, that is, positive electrode active material) accords to that described in Table 1 and is calculated according to the following equation.

$$W(g) = 73.9 \times 14 \times (1 + 0.5X) \times A$$

In the above formula, "A" is a value multiplied in order to subtract, in advance, the amount of lithium originated from a lithium compound other than lithium carbonate left in the raw material after filtration besides the amount required for the precipitation reaction. "A" is 0.9 when, like the case of using a nitrate or acetate, the lithium salt reacts as the calcination raw material, and 1.0 when, like the case of using a sulfate or chloride, the lithium salt does not react as the calcination raw material.

Though lithium-containing carbonate microparticles were precipitated in the solution by this treatment, this precipitate was separated by filtration using a filter press.

Subsequently, the precipitate was dried to obtain a lithium-containing carbonate (precursor of positive electrode active material for lithium ion battery).

Next, a sagger was prepared to fill the lithium-containing carbonate therein. Next, the sagger was placed in an oxygen ambient furnace under atmospheric pressure and heated to 800 to 940° C. for 4 hr. Then, the sagger was kept at this temperature under heating for 12 to 30 hr and then, allowed to cool for 3 hr to obtain an oxide. Then, the obtained oxide was pulverized to obtain a positive electrode active material powder for lithium ion battery.

Example 27

In Example 27, the same procedures as in Examples 1 to 26 were carried out except that each metal of the raw material was altered to the composition shown in Table 1, and a chloride was used as the metal salt to precipitate a lithium-containing carbonate, which was then washed with a saturated lithium carbonate solution, followed by filtration.

Example 28

In Example 28, the same procedures as in Examples 1 to 26 were carried out except that each metal of the raw material was altered to the composition shown in Table 1 and a sulfate was used as the metal salt to precipitate a lithium-containing carbonate, which was then washed with a saturated lithium carbonate solution, followed by filtration.

Example 29

In Example 29, the same procedures as in Examples 1 to 26 were carried out except that each metal of the raw material was altered to the composition shown in Table 1 and the calcination was performed not under atmospheric pressure but under a pressure of 120 KPa.

Comparative Examples 1 to 15

In Comparative Examples 1 to 15, the same procedures as in Examples 1 to 26 were carried out except that each metal in the raw material was altered to the composition shown in Table 1.

TABLE 1

| | | $Li_2CO_3$ | compositional ratio (%) of each metal in all metals except Li | | | | | | | | | calcination temperature |
|---|---|---|---|---|---|---|---|---|---|---|---|---|
| | | (g) | Ni | Co | Mn | Ti | Cr | Fe | Cu | Al | Sn | Mg | (° C.) |
| Example | 1 | 1396 | 70 | 10 | 20 | | | | | | | | 820 |
| | 2 | 1406 | 70 | 10 | 20 | | | | | | | | 820 |
| | 3 | 1396 | 75 | 12.5 | 12.5 | | | | | | | | 850 |
| | 4 | 1396 | 75 | 12.5 | 12.5 | | | | | | | | 850 |
| | 5 | 1396 | 70 | 15 | 15 | | | | | | | | 820 |
| | 6 | 1396 | 70 | 15 | 15 | | | | | | | | 820 |
| | 7 | 1396 | 70 | 15 | 15 | | | | | | | | 820 |
| | 8 | 1396 | 70 | 15 | 15 | | | | | | | | 820 |
| | 9 | 1396 | 75 | 10 | 15 | | | | | | | | 800 |
| | 10 | 1396 | 75 | 10 | 15 | | | | | | | | 820 |
| | 11 | 1396 | 75 | 10 | 15 | | | | | | | | 820 |
| | 12 | 1406 | 75 | 10 | 15 | | | | | | | | 820 |
| | 13 | 1415 | 75 | 10 | 15 | | | | | | | | 830 |
| | 14 | 1406 | 75 | 10 | 10 | 5 | | | | | | | 830 |
| | 15 | 1396 | 75 | 10 | 10 | | 5 | | | | | | 830 |
| | 16 | 1406 | 75 | 10 | 10 | | | 5 | | | | | 830 |
| | 17 | 1396 | 75 | 10 | 10 | | | | 5 | | | | 830 |
| | 18 | 1396 | 75 | 10 | 10 | | | | | 5 | | | 830 |
| | 19 | 1396 | 75 | 10 | 10 | | | | | | 5 | | 830 |
| | 20 | 1396 | 75 | 10 | 10 | | | | | | | 5 | 830 |

TABLE 1-continued

| | | $Li_2CO_3$ (g) | compositional ratio (%) of each metal in all metals except Li | | | | | | | | | calcination temperature (°C.) |
|---|---|---|---|---|---|---|---|---|---|---|---|---|
| | | | Ni | Co | Mn | Ti | Cr | Fe | Cu | Al | Sn | Mg | |
| | 21 | 1396 | 75 | 10 | 10 | 2.5 | | | | | | 2.5 | 830 |
| | 22 | 1396 | 77 | 10 | 13 | | | | | | | | 860 |
| | 23 | 1396 | 77 | 10 | 13 | | | | | | | | 860 |
| | 24 | 1396 | 77 | 10 | 13 | | | | | | | | 860 |
| | 25 | 1396 | 77 | 10 | 13 | | | | | | | | 860 |
| | 26 | 1406 | 77 | 10 | 13 | | | | | | | | 860 |
| | 27 | 1552 | 75 | 10 | 15 | | | | | | | | 860 |
| | 28 | 1552 | 75 | 10 | 15 | | | | | | | | 860 |
| | 29 | 1396 | 75 | 10 | 15 | | | | | | | | 860 |
| Comparative Example | 1 | 1396 | 70 | 10 | 20 | | | | | | | | 840 |
| | 2 | 1406 | 70 | 10 | 20 | | | | | | | | 840 |
| | 3 | 1396 | 75 | 10 | 15 | | | | | | | | 830 |
| | 4 | 1406 | 75 | 10 | 15 | | | | | | | | 850 |
| | 5 | 1415 | 75 | 10 | 15 | | | | | | | | 850 |
| | 6 | 1396 | 75 | 10 | 15 | | | | | | | | 850 |
| | 7 | 1396 | 75 | 10 | 10 | 2.5 | | | | | | 2.5 | 850 |
| | 8 | 1396 | 75 | 10 | 10 | 5 | | | | | | | 850 |
| | 9 | 1396 | 75 | 10 | 10 | | 5 | | | | | | 850 |
| | 10 | 1396 | 75 | 10 | 10 | | | 5 | | | | | 850 |
| | 11 | 1396 | 75 | 10 | 10 | | | | 5 | | | | 850 |
| | 12 | 1396 | 70 | 15 | 15 | | | | | | | | 830 |
| | 13 | 1396 | 77 | 10 | 13 | | | | | | | | 880 |
| | 14 | 1396 | 70 | 10 | 20 | | | | | | | | 830 |
| | 15 | 1396 | 75 | 15 | 10 | | | | | | | | 800 |

(Evaluation)

The contents of Li, Ni, Mn, and Co in each positive electrode active material were measured by induction coupling plasma atomic emission spectrometry (ICP-AES) to calculate the compositional ratio (molar ratio) of each metal. Also, the crystal structure was confirmed to be a layer structure by X-ray diffraction.

Moreover, each positive electrode material was measured by powder XRD diffraction to find the lattice constant from the diffraction pattern. Also, among the measured factors, the lattice constant a was made to lie on the x-axis and the compositional ratio (Li/M) of Li to M (all metals excluding Li) found from MS analysis was made to lie on the y-axis to draw a graph as shown in FIG. 1.

The positive electrode material, a conductive material, and a binder were weighed in a ratio of 85:8:7. The positive electrode active material and the conductive material were mixed in a solution prepared by dissolving the binder in an organic solvent (N-methylpyrrolidone) into a slurry, which was then applied to the surface of an Al foil and pressed after dried to produce a positive electrode. In succession, a 2032-type coin cell for evaluation in which Li was used as the counter electrode was manufactured and an electrolytic solution prepared by dissolving 1M-$LiPF_6$ in EC-DMC (1:1) was used. Then, the coin cell impregnated with the electrolytic solution was used to calculate the battery capacity ratio of a battery capacity at 1 C to a battery capacity at 0.2 C to obtain the rate characteristics of the battery. These results are shown in Table 2.

TABLE 2

| | | lattice constant a | lattice constant c | lattice volume v | Li/M | discharged capacity (0.1 C) (A·h/g) | rate characteristics (%) |
|---|---|---|---|---|---|---|---|
| Example | 1 | 2.8759 | 14.2220 | 101.866 | 1.047 | 189 | 89 |
| | 2 | 2.8761 | 14.2235 | 101.893 | 1.000 | 185 | 87 |
| | 3 | 2.8755 | 14.2223 | 101.841 | 1.060 | 189 | 89 |
| | 4 | 2.8753 | 14.2209 | 101.814 | 1.084 | 192 | 89 |
| | 5 | 2.8764 | 14.2299 | 102.029 | 1.052 | 189 | 89 |
| | 6 | 2.8767 | 14.2248 | 101.875 | 1.081 | 188 | 87 |
| | 7 | 2.8753 | 14.2171 | 101.787 | 1.046 | 198 | 89 |
| | 8 | 2.8746 | 14.2170 | 101.738 | 1.055 | 188 | 88 |
| | 9 | 2.8755 | 14.2199 | 101.827 | 1.034 | 190 | 89 |
| | 10 | 2.8753 | 14.2195 | 101.808 | 1.066 | 189 | 88 |
| | 11 | 2.8738 | 14.2179 | 101.691 | 1.086 | 184 | 88 |
| | 12 | 2.8773 | 14.2262 | 101.996 | 1.091 | 184 | 87 |
| | 13 | 2.8733 | 14.2182 | 101.658 | 1.107 | 184 | 87 |
| | 14 | 2.8771 | 14.2336 | 102.038 | 1.075 | 190 | 89 |
| | 15 | 2.8757 | 14.2263 | 101.886 | 1.099 | 189 | 87 |
| | 16 | 2.8766 | 14.2326 | 101.993 | 1.101 | 189 | 87 |
| | 17 | 2.8761 | 14.2480 | 102.072 | 1.025 | 185 | 88 |
| | 18 | 2.8755 | 14.2463 | 102.014 | 1.055 | 190 | 89 |
| | 19 | 2.8758 | 14.2462 | 102.032 | 1.036 | 190 | 89 |
| | 20 | 2.8749 | 14.2460 | 101.970 | 1.045 | 186 | 88 |

TABLE 2-continued

|  |  | lattice constant a | lattice constant c | lattice volume v | Li/M | discharged capacity (0.1 C) (A·h/g) | rate characteristics (%) |
|---|---|---|---|---|---|---|---|
|  | 21 | 2.8749 | 14.2436 | 101.950 | 1.080 | 189 | 88 |
|  | 22 | 2.8766 | 14.2326 | 101.983 | 1.061 | 195 | 89 |
|  | 23 | 2.8765 | 14.2313 | 101.979 | 1.047 | 190 | 88 |
|  | 24 | 2.8757 | 14.2263 | 101.886 | 1.049 | 190 | 89 |
|  | 25 | 2.8746 | 14.2220 | 101.776 | 1.104 | 187 | 88 |
|  | 26 | 2.8747 | 14.2220 | 101.786 | 1.097 | 189 | 89 |
|  | 27 | 2.8741 | 14.2188 | 101.716 | 1.050 | 180 | 84 |
|  | 28 | 2.8770 | 14.2244 | 101.963 | 1.055 | 183 | 83 |
|  | 29 | 2.8754 | 14.2295 | 101.838 | 1.060 | 191 | 91 |
| Comparative Example | 1 | 2.8789 | 14.2311 | 102.145 | 1.121 | 182 | 85 |
|  | 2 | 2.8751 | 14.2224 | 101.845 | 1.021 | 183 | 86 |
|  | 3 | 2.8733 | 14.2215 | 101.680 | 1.095 | 181 | 86 |
|  | 4 | 2.8730 | 14.2197 | 101.713 | 1.11 | 183 | 86 |
|  | 5 | 2.8775 | 14.2256 | 102.009 | 1.092 | 176 | 84 |
|  | 6 | 2.8741 | 14.2209 | 101.729 | 1.109 | 182 | 85 |
|  | 7 | 2.8744 | 14.2222 | 101.763 | 1.043 | 182 | 87 |
|  | 8 | 2.8761 | 14.2162 | 101.840 | 0.980 | 185 | 85 |
|  | 9 | 2.8770 | 14.2241 | 101.962 | 1.109 | 180 | 86 |
|  | 10 | 2.8757 | 14.2211 | 101.841 | 1.003 | 185 | 86 |
|  | 11 | 2.8766 | 14.2254 | 101.963 | 1.007 | 178 | 80 |
|  | 12 | 2.8734 | 14.2130 | 101.623 | 1.116 | 183 | 86 |
|  | 13 | 2.8772 | 14.2206 | 101.949 | 1.056 | 183 | 86 |
|  | 14 | 2.8749 | 14.1988 | 101.692 | 1.036 | 179 | 82 |
|  | 15 | 2.8773 | 14.2531 | 102.051 | 1.053 | 176 | 80 |

When the resultant data of Table 2 is plotted on a graph of FIG. 1 and linear lines are drawn so as to enclose the plotted points at which good capacity and rate characteristics of the battery are exhibited, it is found that these points are included within the region enclosed by three lines: (1) y=1.108, (2) y=−37.298x+108.27, and (3) y=75.833x−217.1 in FIG. 1.

Generally, considerable time is required to evaluate battery characteristics when a positive electrode active material is used for a battery. However, according to the present invention, the characteristics of a battery provided with a positive electrode active material having a predetermined lattice constant c can be evaluated only by writing the above three lines on a graph in which the x-axis represents the lattice constant a and the y-axis represents the compositional ratio (Li/M) of Li to M to determine whether or not the coordinates of the lattice constant a and compositional ratio (Li/M) are within the region enclosed by the three lines. Therefore, the time required for the evaluation of a battery can be shortened, which improves the efficiency of battery production and reduces production cost.

Moreover, it is found that if lines are drawn so as to enclose those having more excellent battery capacity and rate characteristics, they are included within the region enclosed by three lines: (1) y=5x−13.311, (2) y=49.737x−142.02, and (3) y=−60x+173.56 in FIG. 1.

Also, Examples 1 to 26 and 29 each use a nitrate as the metal salt to be poured and therefore, positive electrode active materials containing oxygen exceeding that in the compositional formula is finally produced. When comparing Examples 27 and 28 using a chloride and sulfate as the metal salt with those having the same condition other than the metal salt, the battery characteristics are more improved (for example, comparison of Example 10 with Examples 27 and 28).

Moreover, in Example 29 in which the positive electrode material precursor was calcined not under atmospheric pressure but under a predetermined pressure, a positive electrode active material containing oxygen exceeding that in the compositional formula is finally produced. Therefore, when comparing Example 32 with those having the same condition other than the pressure, Example 32 was more improved in battery characteristics (for example, comparison of Example 10 with Example 29).

Comparative Examples 1 to 13 are excluded from the region enclosed by three lines: (1) y=1.108, (2) y=−37.298x+108.27, and (3) y=75.833x−217.1 in FIG. 1 and had inferior battery characteristics. Also, Comparative Examples 14 and 15 had inferior battery characteristics because they had a lattice constant c out of the defined range from 14.2 to 14.25, though they were included within the region enclosed by three lines: (1) y=1.108, (2) y=−37.298x+108.27, and (3) y=75.833x−217.1 in FIG. 1.

What is claimed is:

1. A positive electrode active material for a lithium ion battery which has a layer structure represented by a compositional formula:

$Li_\alpha(Ni_\beta Me_{1-\beta})O_\gamma$, wherein Me represents at least one type selected from the group consisting of Mn, Co, Al, Mg, Cr, Ti, Fe, Nb, Cu and Zr, α denotes a number from 0.9 to 1.2, β denotes a number from 0.70 to 0.79, and γ denotes a number of 1.9 or more, wherein measured coordinates of lattice constant a and a compositional ratio (Li/M) of Li to M, wherein M is the sum of all metals excluding Li in the above compositional formula, are within a region enclosed by three lines given by a set of equations: y=1.108, y=−37.298x+108.27, and y=75.833x−217.1 on a graph in which the x-axis represents a lattice constant a and the y-axis represents the compositional ratio (Li/M) of Li to M, and measured coordinates of lattice constant c is from 14.2 to 4.25.

2. The positive electrode active material for a lithium ion battery according to claim 1, wherein the coordinates of the lattice constant a and compositional ratio (Li/M) are within the region enclosed by three lines given by the equations: y=5x−13.311, y=49.737x−142.02, and y=−60x+173.56.

3. The positive electrode active material for a lithium ion battery according to claim 1, wherein Me is one metal selected from the group consisting of Mn, Co, and Al.

4. A positive electrode for a lithium ion battery comprising the positive electrode active material described in claim 1.

5. A lithium ion battery comprising the positive electrode for lithium ion battery described in claim 4.

6. A positive electrode for lithium ion battery comprising the positive electrode active material described in claim 2.

7. A positive electrode for lithium ion battery comprising the positive electrode active material described in claim 3.

8. A lithium ion battery comprising the positive electrode for lithium ion battery described in claim 6.

9. A lithium ion battery comprising the positive electrode for lithium ion battery described in claim 7.

\* \* \* \* \*